Jan. 2, 1923.
G. W. GARWOOD.
VALVE SPRING LIFTER.
FILED APR. 23, 1921.
1,440,534.
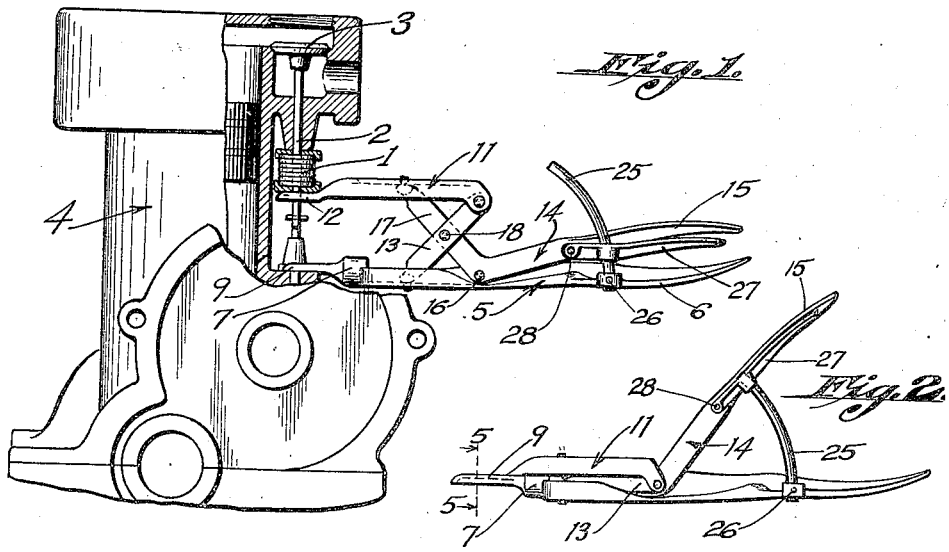
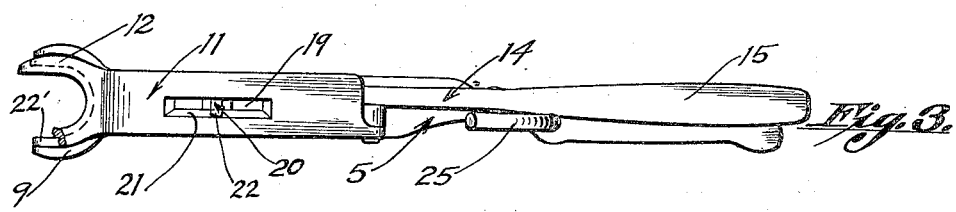
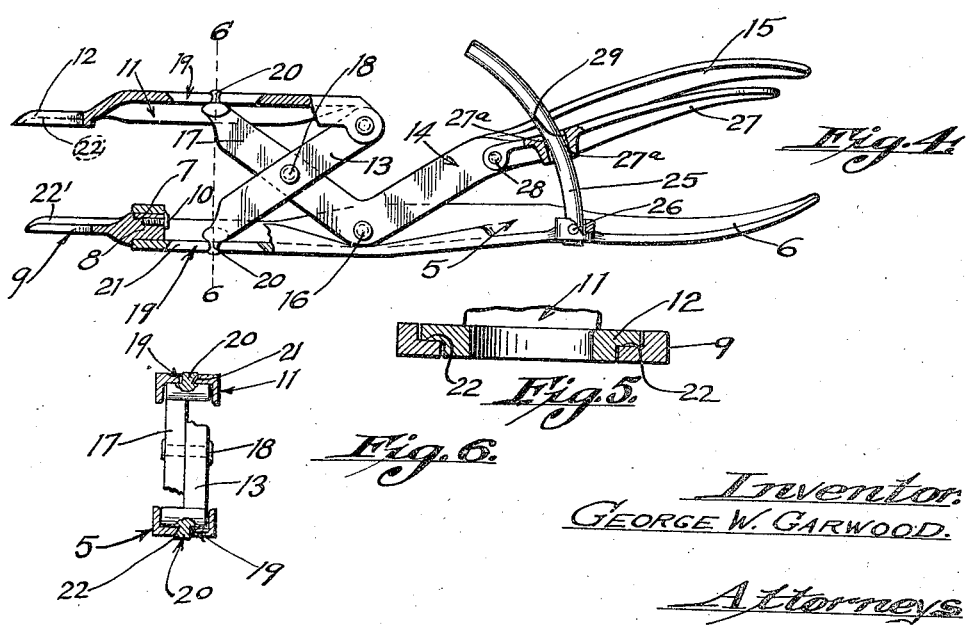
Inventor:
George W. Garwood.
Attorneys Patented Jan. 2, 1923.

1,440,534

UNITED STATES PATENT OFFICE.

GEORGE WENDALL GARWOOD, OF EL MONTE, CALIFORNIA.

VALVE-SPRING LIFTER.

Application filed April 23, 1921. Serial No. 463,751.

*To all whom it may concern:*

Be it known that I, GEORGE WENDALL GARWOOD, a citizen of the United States, residing at El Monte, in the county of Los Angeles and State of California, have invented new and useful Improvements in Valve-Spring Lifters, of which the following is a specification.

This invention relates to valve spring lifters, and has for its object the provision of a construction wherein the two engaging members will be moved in parallel relation relative to one another in order to compress a valve spring or the like.

It is the further object of the invention to provide automatic means whereby the engaging members, as they are moved apart for compressing a valve spring, will be automatically locked in any position to which they are moved and against movement of said engaging members toward one another until the locking means has been manually released.

It is a further object of the invention to provide an improved construction for the engaging members wherein said members are so arranged that when moved toward one another into the position to be inserted beneath a spring, that the engaging members will lie one within the other in the same plane, and as a consequence the apparatus may be readily placed in operative position, even though the space for receiving the engaging members is generally restricted.

The invention will be readily understood from the following description of the accompanying drawings, in which—

Figure 1 is a side elevation of the valve spring lifter showing the same in position compressing a spring.

Fig. 2 is a similar view of the valve spring lifter showing the engaging members retracted toward one another.

Fig. 3 is a plan view of the valve spring lifter.

Fig. 4 is a side elevation of the same partly broken away.

Fig. 5 is a cross section through the closed forks.

Fig. 6 is a cross section on line 6—6, Fig. 4.

In the drawings I have shown the improved valve spring lifter as employed in connection with the spring 1 upon the valve rod 2 of a valve 3 for a usual internal combustion engine 4.

The valve spring lifter includes an arm 5 having a handle 6 at one end, and at its other end forming a longitudinal bearing 7 in which is swiveled a bearing pin 8 carrying a projecting fork 9 forming one of the engaging members of the device. The pin 8 may be held against longitudinal displacement from bearing 7 by means of a screw 10 threaded into the end of said pin and having its end engaging the end wall of bearing 7.

The other member 11 of the valve spring lifter is provided at one end with a fork 12, and at its rear end is pivoted to a link 13 which is slidable along the length of member 5. A second handle member 14 is provided at its rear end with a handle 15 co-operating with handle 6, and said handle member is pivoted to member 5 as shown at 16. The portion of this handle member extending beyond pivot 16 is an angularly disposed extension 17 pivoted to link 13, as shown at 18, and slidably engaging the member 11 of the mechanism.

The slidable connection provided between members 13 and 17 and the co-operating engaging members of the valve spring lifter, are shown as comprising slots 19 in members 11 and 5 with heads 20 upon members 13 and 17 slidable in said slots. These heads are held against displacement from the slots by providing the latter at one side with inclined walls 21, and by forming the heads 20 with lateral extensions 22 received over the inclined walls 21.

It will be noted by the construction as thus described, that when handles 15 and 6 are moved toward one another that the members 5 and 11 will be moved away from one another in parallel relation due to the toggle joint connection formed between the same, and as a consequence the forks 9 and 12 engaging beneath spring 1 and against the engine block of the engine in usual manner, will be moved apart parallel to the spring and the valve rod so as to compress the valve spring without a binding action.

When it is desired to insert the valve spring lifter beneath the end of a valve, the forks 9 and 12 are moved toward one another, as shown in Fig. 2, in order to be inserted between the end of the valve and the casing of the engine. Since this space is necessarily restricted, means are provided for retracting the forks of the lifter into the same plane so as to make it possible to readily insert the forks in operative position. For this purpose the fork 12 is shown as somewhat smaller than the fork 9, and the inner edge of fork 9 and the outer edge of fork 12 are cutaway, as shown, so that said forks may be readily received one within another, as shown in Fig. 5.

As handles 6 and 15 are moved toward one another, the engaging members of the valve spring lifter are moved apart, as previously described, and a locking means is provided upon the handles arranged to automatically lock the latter in any position to which they are moved, and against movement away from one another so as to prevent movement of the engaging members toward one another. For this purpose an arcuate rod 25 is mounted upon the lowermost handle 6 as by the pivotal connection 26, and said rod extends upwardly and across handle 15. A locking handle 27 is pivoted at 28 upon handle 15, and the arcuate locking rod is received through bearing 29 of said locking handle.

By this arrangement it will be seen that when handle 15 and the locking handle are forced downwardly that said handles will readily move toward handle 6 so as to spread the engaging members, but that when the handles have been moved to the desired position relative to one another, and the pressure of spring 1 is exerted upon fork 12 so as to tend to swing handles 15 and 6 away from one another, that the pivoted locking handle 27, tending to swing downwardly upon its pivot, will bind at opposite sides 27ª of the respective ends of its bearing 29 upon locking rod 25, so as to lock handles 15 and 6 against relative movement. As a consequence the valve will be held in any position to which it has been compressed.

Various changes may be made without departing from the spirit of the invention as claimed.

What is claimed is:

1. A valve spring lifter comprising an arm having an engaging end and a handle end, a second engaging member, and a second arm having a handle end and a connection with said second engaging member, the parts being connected for parallel movement of said arms relative to one another, and means for locking said parts at any position.

2. A valve spring lifter comprising an arm having an engaging end and a handle end, a second engaging member, and a second arm pivoted to the first arm and having an angular extension slidably engaging the second engaging member, and a link pivoted to the second engaging member and slidably engaging the first engaging member.

3. A valve spring lifter comprising arms movable relative to one another, said arms having engaging forks with their inner and outer edges undercut respectively, and said forks adapted to be received one within another so as to lie in the same plane.

4. A valve spring lifter comprising arms movable relative to one another, said arms having engaging forks with one of said forks swiveled to its arm.

5. A valve spring lifter comprising arms movable relative to one another, said arms having engaging means and handles adapted to be swung toward one another for spreading said engaging means, an arcuate locking bar connected to the lower handle and extending upwardly across the second handle, and a locking handle pivoted to said second handle and having said locking bar sliding through the same for binding locking engagement between said locking bar and handle.

6. A valve spring lifter comprising an arm having an engaging end and a handle end, a second engaging member, and a second arm having a handle end and a connection with said second engaging member, the parts being connected for parallel movement of said arms relative to one another, and means for locking said parts at any position, said means including a lever pivoted on one arm and a curved rod fixed on the other and sliding in said lever when released thereby.

7. A valve spring lifter comprising an arm having an engaging end and a handle end, a second engaging member, and a second arm having a handle end and a connection with said second engaging member, the parts being connected for parallel movement of said arms relative to one another, and means for locking said parts at any position, said means including a lever pivoted on one arm and a curved rod fixed on the other and sliding in said lever when released thereby, said rod being concentric to the pivot connection of said arms.

8. A valve spring lifter having a pair of parallel arms, and engaging members on said arms adapted to be collapsed one within the other.

In testimony whereof I have signed my name to this specification.

GEORGE WENDALL GARWOOD.